(12) United States Patent
Watanabe et al.

(10) Patent No.: US 11,475,676 B2
(45) Date of Patent: Oct. 18, 2022

(54) PERIPHERY MONITORING DEVICE

(71) Applicant: AISIN CORPORATION, Kariya (JP)

(72) Inventors: Kazuya Watanabe, Anjo (JP); Tetsuya Maruoka, Okazaki (JP)

(73) Assignee: AISIN CORPORATION, Kariya (JP)

(*) Notice: Subject to any disclaimer, the term of this patent is extended or adjusted under 35 U.S.C. 154(b) by 142 days.

(21) Appl. No.: 16/617,738

(22) PCT Filed: Feb. 26, 2018

(86) PCT No.: PCT/JP2018/007056
§ 371 (c)(1),
(2) Date: Nov. 27, 2019

(87) PCT Pub. No.: WO2018/220915
PCT Pub. Date: Dec. 6, 2018

(65) Prior Publication Data
US 2020/0193183 A1 Jun. 18, 2020

(30) Foreign Application Priority Data

Jun. 2, 2017 (JP) .............................. JP2017-110336

(51) Int. Cl.
*G06V 20/58* (2022.01)
*B60R 11/02* (2006.01)
*B60R 11/04* (2006.01)

(52) U.S. Cl.
CPC .......... *G06V 20/58* (2022.01); *B60R 11/0229* (2013.01); *B60R 11/04* (2013.01);
(Continued)

(58) Field of Classification Search
CPC ........... G06K 9/00201; G06K 9/00778; G06K 9/00785; G06K 9/00791; G06K 9/00798;
(Continued)

(56) References Cited

U.S. PATENT DOCUMENTS

2006/0287825 A1 12/2006 Shimizu et al.
2006/0287826 A1 12/2006 Shimizu et al.
(Continued)

FOREIGN PATENT DOCUMENTS

JP 2012-147149 A 8/2012
JP 2017-068826 A 4/2017
(Continued)

OTHER PUBLICATIONS

Notification of the First Office Action dated Oct. 9, 2020 from the China National Intellectual Property Administration in Application No. 201880048732.4.
(Continued)

*Primary Examiner* — Nathnael Aynalem
(74) *Attorney, Agent, or Firm* — Sughrue Mion, PLLC

(57) ABSTRACT

A periphery monitoring device according to an embodiment includes: an acquisition unit configured to acquire captured image data from an image-capturing unit that captures a region including a road surface in a traveling direction of a vehicle and a region above the road surface; a storage unit configured to store the captured image data; and an image processing unit configured to display, in a case of displaying a peripheral image in the traveling direction of the vehicle on a display unit, a first region including a road surface on a under-floor portion of the vehicle or a road surface on a vicinity of the under-floor portion by using a corresponding image in past captured image data stored in the storage unit, and display a second region including the region above the road surface by using a corresponding image in current captured image data acquired by the acquisition unit.

2 Claims, 14 Drawing Sheets

(52) U.S. Cl.
CPC ..... *B60R 2300/70* (2013.01); *B60R 2300/802* (2013.01); *B60R 2300/8093* (2013.01)

(58) Field of Classification Search
CPC ........... G06K 9/00805; G06K 9/00812; G06K 9/00818; G06K 9/00825; G06K 9/00845; G06K 9/325; G06K 2209/15; G06K 2209/23; G06T 2207/30236; G06T 2207/30248; G06T 2207/30252; G06T 2207/30256; G06T 2207/30261; G06T 2207/30264; G06T 2207/30268; G08G 1/16; G08G 1/116; G08G 1/167; G08G 1/168; G08G 1/20; B60W 50/14; B60W 2050/143; B60W 2550/10; B60W 2550/14; B60R 2001/1215; B60R 2025/1013; B60R 2025/1016; G01S 17/93; G01S 17/931; B62D 15/029; H04W 4/40
USPC ........................................................ 348/148
See application file for complete search history.

(56) References Cited

U.S. PATENT DOCUMENTS

| | | | | |
|---|---|---|---|---|
| 2009/0122140 A1* | 5/2009 | Imamura | ............... | B60Q 9/005 348/148 |
| 2010/0201818 A1* | 8/2010 | Imanishi | ................. | B60R 1/00 348/148 |
| 2012/0293660 A1* | 11/2012 | Murakami | ......... | G06K 9/00812 348/148 |
| 2012/0314072 A1* | 12/2012 | Kiyo | ....................... | B60R 1/00 348/148 |
| 2013/0120578 A1 | 5/2013 | Iga et al. | | |
| 2014/0055487 A1* | 2/2014 | Kiyo | ...................... | G06T 11/60 345/629 |
| 2016/0001704 A1 | 1/2016 | Nakasho et al. | | |
| 2018/0111553 A1 | 4/2018 | Kubota et al. | | |
| 2018/0201191 A1 | 7/2018 | Nakasho et al. | | |
| 2019/0026557 A1 | 1/2019 | Watanabe et al. | | |

FOREIGN PATENT DOCUMENTS

| | | |
|---|---|---|
| WO | 2016/158984 A1 | 10/2016 |
| WO | 2014/156220 A1 | 2/2017 |
| WO | 2017/056989 A1 | 4/2017 |

OTHER PUBLICATIONS

International Search Report for PCT/JP2018/007056 dated May 1, 2018 [PCT/ISA/210].
Written Opinion for PCT/JP2018/007056 dated May 1, 2018 [PCT/ISA/237].

* cited by examiner

PERIPHERY MONITORING DEVICE

CROSS-REFERENCE TO RELATED APPLICATIONS

This application is a national stage application of International Application No. PCT/JP2018/007056, filed on Feb. 26, 2018, which designates the United States, incorporated herein by reference, and which claims the benefit of priority from Japanese Patent Application No. 2017-110336, filed on Jun. 2, 2017, the entire contents of which are incorporated herein by reference.

TECHNICAL FIELD

Embodiments described herein relate to a periphery monitoring device.

BACKGROUND

Conventionally, there is known a technique of capturing a peripheral environment by an onboard camera and displaying a peripheral image thereof on a display unit in a vehicle. There is also known a technique of generating and displaying a peripheral image including a under-floor portion of the vehicle and a vicinity of the under-floor portion using a past image captured by a front camera of the vehicle (hereinafter, also referred to as a "past image") in a case in which the vehicle is moving forward, for example, to display the under-floor portion of the vehicle and the vicinity of the under-floor portion as blind spots of the onboard camera. Viewing such a peripheral image can be reference for a driver to make various kinds of determination when driving.

Patent Document 1: WO 2014/156220

However, the past image is used in the technique of displaying the peripheral image including the under-floor portion of the vehicle and the vicinity of the under-floor portion described above, so that there is the problem that, even if a moving object such as a person or a vehicle is currently present in a region of the peripheral image, the moving object is not displayed.

The embodiments described herein are attained in view of such a situation, and it is an object to provide a periphery monitoring device that can display a peripheral image including the under-floor portion of the vehicle and the vicinity of the under-floor portion, and can also display a current moving object in the region of the peripheral image at the same time.

A periphery monitoring device according to an embodiment includes an acquisition unit, a storage unit, and an image processing unit. The acquisition unit is configured to acquire captured image data from an image-capturing unit that captures a region including a road surface in a traveling direction of a vehicle and a region above the road surface. The storage unit is configured to store therein the captured image data. The image processing unit is configured to display, in a case of displaying a peripheral image in the traveling direction of the vehicle on a display unit, a first region including a road surface on a under-floor portion of the vehicle or a road surface on a vicinity of the under-floor portion by using a corresponding image in past captured image data stored in the storage unit, and display a second region including the region above the road surface by using a corresponding image in current captured image data acquired by the acquisition unit. With this configuration, for example, in a case of displaying the peripheral image including the under-floor portion of the vehicle or the vicinity of the under-floor portion, a current moving object in the region of the peripheral image can also be displayed at the same time by displaying the first region including a road surface on the under-floor portion of the vehicle or a road surface on the vicinity of the under-floor portion using a past image, and displaying the second region including the region above the road surface using a current image.

Furthermore, the image processing unit can display the first region by projecting the corresponding image in the past captured image data stored in the storage unit on a first virtual projection surface that is set as a plane corresponding to the road surface in a three-dimensional virtual space. Additionally, the image processing unit can display the second region by projecting the corresponding image in the current captured image data acquired by the acquisition unit on a second virtual projection surface that is set to rise from an end part of the first virtual projection surface or from a vicinity of the end part in the three-dimensional virtual space, and can display a boundary between the first virtual projection surface and the second virtual projection surface to be distinguishable. With this configuration, for example, by displaying the boundary between the first virtual projection surface that is displayed using the past image and the second virtual projection surface that is displayed using the current image so that the boundary can be discriminated, the driver can clearly discriminate between a portion of the past image and a portion of the current image in display.

The periphery monitoring device further includes a moving object determination unit configured to determine whether a moving object is present in the traveling direction of the vehicle based on at least one of the captured image data from the image-capturing unit acquired by the acquisition unit and detection data from a range sensor disposed in the vehicle. In a case of displaying the peripheral image in the traveling direction of the vehicle on the display unit, the image processing unit can switch display in the following manner. When the moving object determination unit does not determine that the moving object is present, a corresponding image in the past captured image data stored in the storage unit is used for displaying both of the first region and the second region; and when the moving object determination unit determines that the moving object is present, the first region is displayed by using a corresponding image in the past captured image data stored in the storage unit, and the second region is displayed by using a corresponding image in the current captured image data acquired by the acquisition unit. With this configuration, for example, when the moving object is not present, a continuous image without a joint can be obtained by displaying both of the first region and the second region using a past image. If it is determined that the moving object is present, the current moving object in the region of the peripheral image can also be displayed by switching display so that the second region is displayed by using the current image.

The periphery monitoring device further includes a moving object determination unit configured to determine whether a moving object is present in the traveling direction of the vehicle based on at least one of the captured image data from the image-capturing unit acquired by the acquisition unit and detection data from a range sensor disposed in the vehicle. In a case of displaying the peripheral image in the traveling direction of the vehicle on the display unit, the image processing unit can display a screen for prompting an occupant to switch display in the following manner. When the moving object determination unit does not determine that the moving object is present, a corresponding image in the past captured image data stored in the storage unit is used for displaying both of the first region and the second region; and when the moving object determination unit determines that the moving object is present, the first region is displayed by using a corresponding image in the past captured image data stored in the storage unit, and the second region is displayed by using a corresponding image in the current captured image data acquired by the acquisition unit. With this configuration, for example, when the moving object is not present, a continuous image without a joint can be obtained by displaying both of the first region and the second region by using the past image. If it is determined that the moving object is present, by displaying the screen for prompting the occupant to switch display so that the second region is displayed by using the current image, the occupant is enabled to freely select whether to switch the screen.

The periphery monitoring device further includes a moving object determination unit configured to determine whether a moving object is present in the traveling direction of the vehicle based on at least one of the captured image data from the image-capturing unit acquired by the acquisition unit and detection data from a range sensor disposed in the vehicle. In a case of displaying the peripheral image in the traveling direction of the vehicle on the display unit, when the moving object determination unit determines that the moving object is present, the image processing unit can move a boundary portion between the first virtual projection surface and the second virtual projection surface based on a position of the moving object in the peripheral image. With this configuration, for example, when it is determined that the moving object is present, by moving the boundary portion between the first virtual projection surface and the second virtual projection surface based on the position of the moving object in the peripheral image, the occupant is enabled to recognize the presence of the moving object more easily.

BRIEF DESCRIPTION OF DRAWINGS

FIG. 1 is a perspective view illustrating a state in which part of a compartment of a vehicle according to a first embodiment is seen through;

DESCRIPTION OF EMBODIMENTS

The following discloses an exemplary embodiment (first embodiment to fourth embodiment). A configuration of the embodiment, and a function, a result, and an effect described below obtained with the configuration are merely examples. A configuration other than the configuration disclosed in the following embodiments is usable, and at least one of various effects and derivative effects based on a basic configuration is obtainable.

First Embodiment

First, the following describes a first embodiment. A vehicle 1 (FIG. 1) in the first embodiment may be, for example, an automobile including an internal combustion engine (not illustrated) as a driving source, that is, an internal combustion engine automobile, or an automobile including an electric motor (not illustrated) as a driving source, that is, an electric vehicle, a fuel battery automobile, and the like. The vehicle 1 may also be a hybrid automobile including both of the internal combustion engine and the electric motor as driving sources, or an automobile including another driving source. The vehicle 1 can be equipped with various transmissions, and can be equipped with various devices required for driving the internal combustion engine and the electric motor, for example, a system, a component, and the like. Schemes, the number, layouts, and the like of devices related to driving of a wheel 3 in the vehicle 1 can be variously set.

Figure 1:
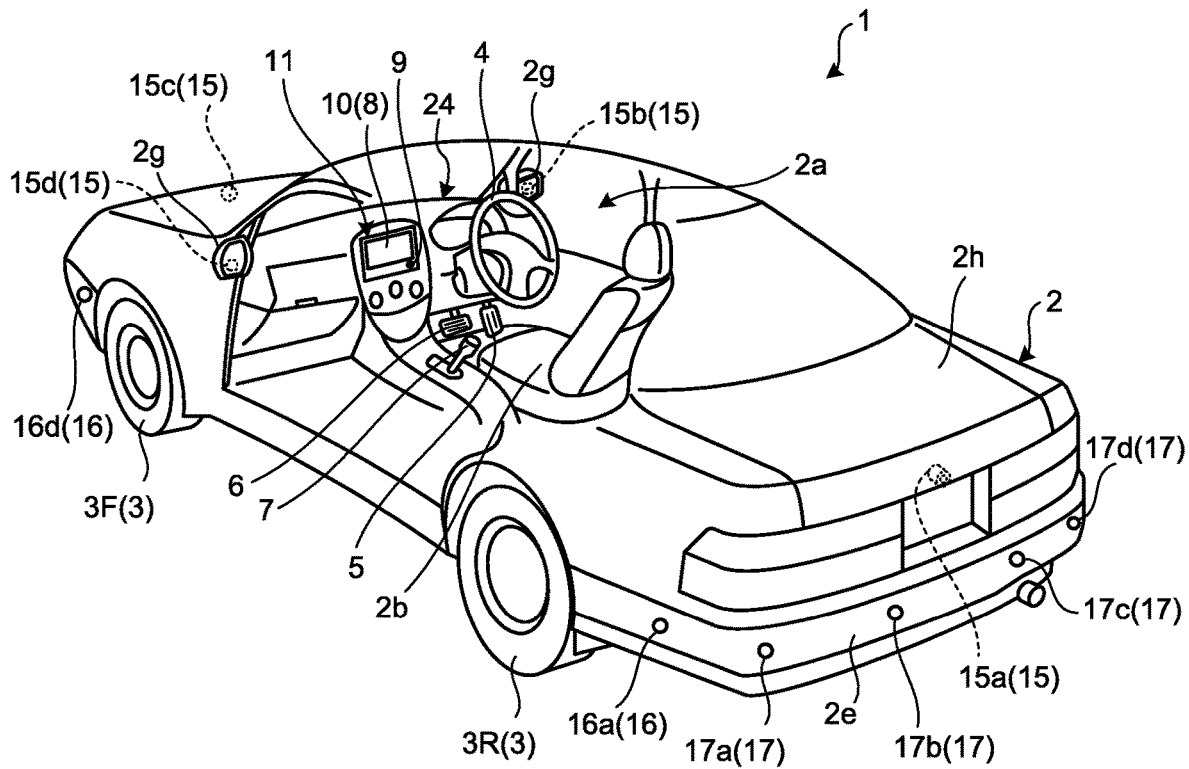
Figure 2:
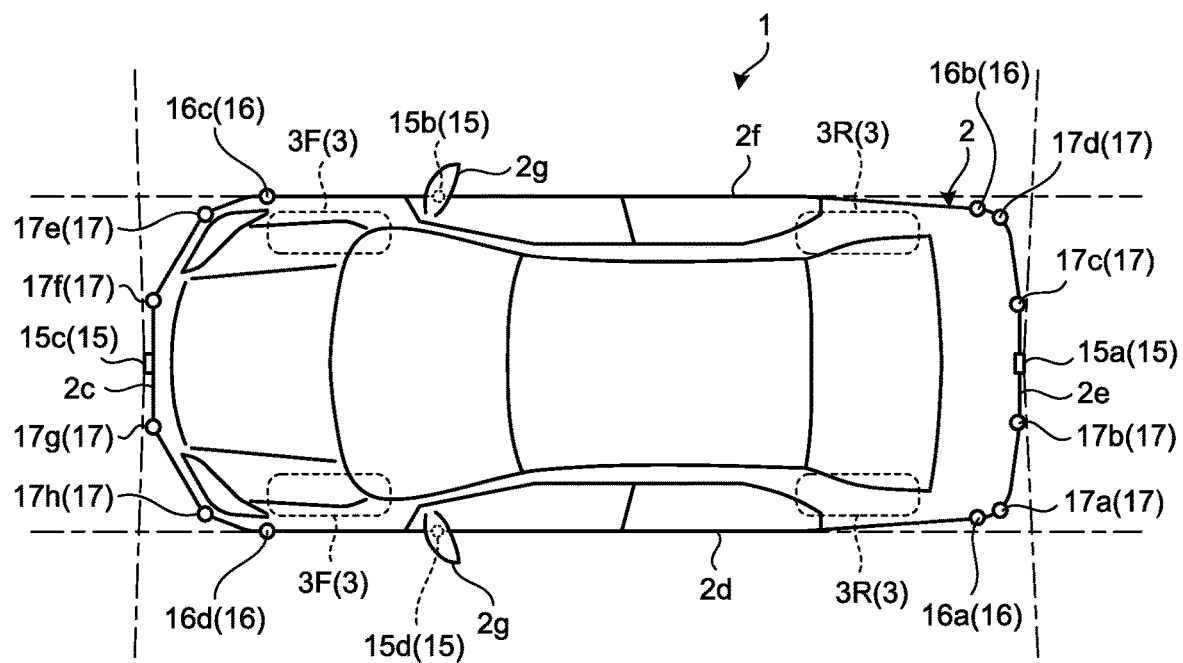
FIG. 2 is a plan view (overhead view) of the vehicle according to the first embodiment.

FIG. 1 is a perspective view illustrating a state in which part of a compartment 2a of the vehicle 1 according to the first embodiment is seen through. FIG. 2 is a plan view (overview) of the vehicle 1 according to the first embodiment. The following is described with reference to both of the drawings. A vehicle body 2 constitutes the compartment 2a (FIG. 1) in which an occupant (not illustrated) rides. In the compartment 2a, a steering unit 4, an acceleration operating unit 5, a braking operation unit 6, a gear shift operating unit 7, and the like are disposed in a state of facing a seat 2b of a driver as the occupant.

The steering unit 4 is, for example, a steering wheel (handle) projecting from a dashboard 24. The acceleration operating unit 5 is, for example, an accelerator pedal that is positioned under a foot of the driver. The braking operation unit 6 is, for example, a brake pedal that is positioned under a foot of the driver. The gear shift operating unit 7 is, for example, a shift lever projecting from a center console. The steering unit 4, the acceleration operating unit 5, the braking operation unit 6, the gear shift operating unit 7, and the like are not limited thereto.

Figure 3:
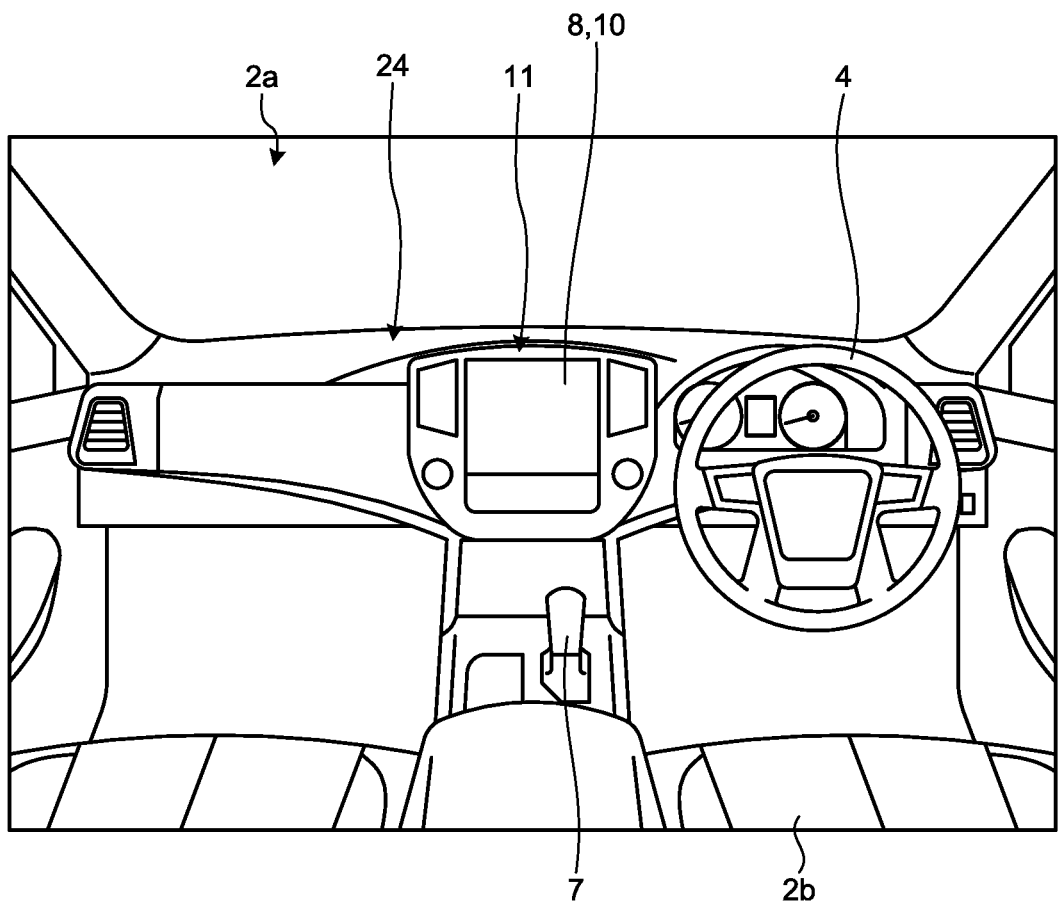
FIG. 3 is a diagram illustrating a configuration of a dashboard of the vehicle according to the first embodiment.

In the compartment 2a, a display device 8 serving as a display output unit and a sound output device 9 serving as a sound output unit are also disposed. FIG. 3 is a diagram illustrating a configuration of the dashboard 24 of the vehicle 1 according to the first embodiment. As exemplified in FIG. 3, the display device 8 is disposed at the center of the dashboard 24.

The display device 8 illustrated in FIG. 1 and FIG. 3 is, for example, a liquid crystal display (LCD), an organic electro-luminescence display (OELD), and the like. The sound output device 9 is, for example, a speaker. The display device 8 is, for example, covered with a transparent operation input unit 10 such as a touch panel. The occupant can visually recognize an image displayed on a display screen of the display device 8 via the operation input unit 10. The occupant can also perform an operation input by operating (touching, pushing, or moving) the operation input unit 10 with a finger and the like at a position corresponding to the image displayed on the display screen of the display device 8. The display device 8, the sound output device 9, the operation input unit 10, and the like are disposed, for example, in a monitor device 11 positioned at a center part in a vehicle width direction, that is, a right and left direction of the dashboard 24. The monitor device 11 may include an operation input unit (not illustrated) such as a switch, a dial, a joystick, and a push button. A sound output device (not illustrated) may be disposed at another position different from the position of the monitor device 11 in the compartment 2a, or sound may be output from a sound output device different from the sound output device 9 of the monitor device 11. The monitor device 11 may also be used for a navigation system and an audio system, for example.

As exemplified in FIG. 1 and FIG. 2, the vehicle 1 is a four-wheeled automobile, for example, and includes two left and right front wheels 3F and two left and right rear wheels 3R. All of these four wheels 3 are turnably configured.

Figure 4:
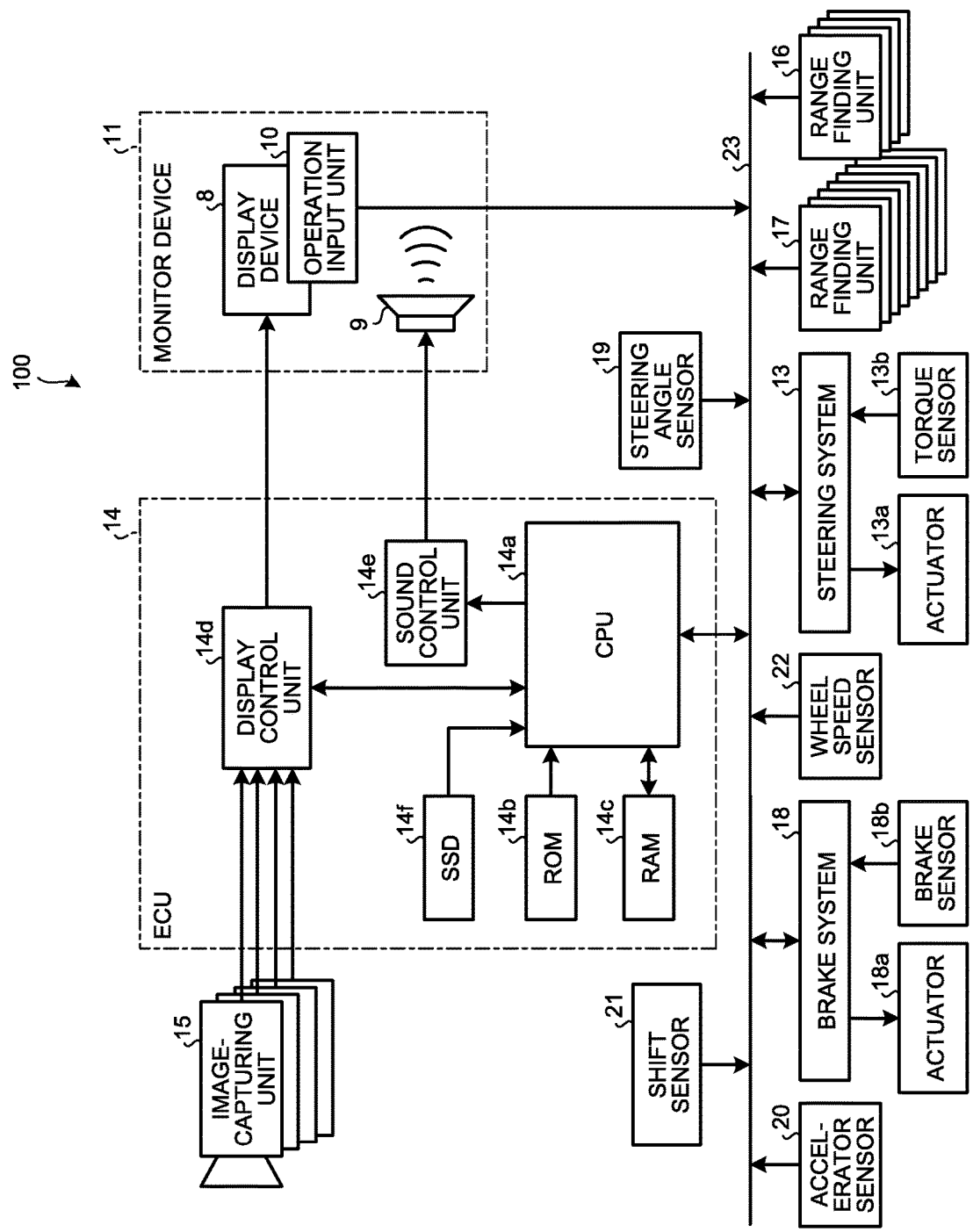
FIG. 4 is a block diagram illustrating a configuration of a periphery monitoring device according to the first embodiment.

FIG. 4 is a block diagram illustrating a configuration of a periphery monitoring device 100 according to the first embodiment. As exemplified in FIG. 4, the vehicle 1 includes a steering system 13 that steers at least two of the wheels 3. The steering system 13 includes an actuator 13a and a torque sensor 13b. The steering system 13 is electrically controlled by an electronic control unit (ECU) 14 and the like to operate the actuator 13a. The steering system 13 is, for example, an electric power steering system, a steer by wire (SBW) system, and the like. The steering system 13 applies torque, that is, assist torque to the steering unit 4 with the actuator 13a to compensate for steering force, or turns the wheel 3 with the actuator 13a. In this case, the actuator 13a may turn one wheel 3, or turn a plurality of wheels 3. The torque sensor 13b detects, for example, torque that is applied to the steering unit 4 by the driver.

As exemplified in FIG. 2, the vehicle body 2 includes a plurality of image-capturing units 15 disposed therein, for example, four image-capturing units 15a to 15d. The image-capturing unit 15 is, for example, a digital camera incorporating an imaging element such as a charge coupled device (CCD) or a CMOS image sensor (CIS). The image-capturing unit 15 can output moving image data at a predetermined frame rate. Each of the image-capturing units 15 includes a wide-angle lens or a fisheye lens, and can image a range from 140° to 190° in a horizontal direction, for example. An optical axis of the image-capturing unit 15 is set obliquely downward. Thus, the image-capturing unit 15 successively images an external environment around the vehicle body 2 including a road surface on which the vehicle 1 can move and a region in which the vehicle 1 can be parked to be output as captured image data.

The image-capturing unit 15a is, for example, positioned at an end part 2e on a rear side of the vehicle body 2, and disposed on a wall part below a door 2h of a rear trunk. The image-capturing unit 15b is, for example, positioned at an end part 2f on a right side of the vehicle body 2, and disposed on a door mirror 2g on the right side. The image-capturing unit 15c is, for example, positioned at an end part 2c on a front side of the vehicle body 2, that is, on the front side in a vehicle longitudinal direction, and disposed on a front bumper and the like. The image-capturing unit 15d is, for example, positioned at an end part 2d on a left side of the vehicle body 2, that is, on the left side in a vehicle width direction, and disposed on the door mirror 2g as a projecting part on the left side. The ECU 14 performs arithmetic processing and image processing based on the captured image data obtained by the image-capturing units 15 to generate an image having a wider viewing angle, or generate a virtual overhead image obtained by viewing the vehicle 1 from above.

As exemplified in FIG. 2, the vehicle body 2 includes four range finding units 16a to 16d and eight range finding units 17a to 17h, for example, as a plurality of range finding units 16 and 17 (range sensors) disposed therein. The range finding units 16 and 17 are, for example, sonar (a sonar sensor, an ultrasonic detector) that emits ultrasonic waves and catches reflected waves thereof. The ECU 14 can determine whether there is an object such as an obstacle positioned around the vehicle 1, or measure a distance to the object based on a detection result (detection data) obtained by the range finding units 16 and 17. The range finding unit 17 is used for detecting an object at a relatively short distance, for example. The range finding unit 16 is used for detecting an object at a relatively long distance as compared with the range finding unit 17, for example. The range finding unit 17 is used for detecting an object in front of or in the rear of the vehicle 1, for example. The range finding unit 16 is used for detecting an object on a side of the vehicle 1.

As exemplified in FIG. 4, in a periphery monitoring device 100, a brake system 18, a steering angle sensor 19, an accelerator sensor 20, a shift sensor 21, a wheel speed sensor 22, and the like in addition to the ECU 14, the monitor device 11, the steering system 13, the range finding units 16 and 17, and the like are electrically connected via an in-vehicle network 23 serving as an electric communication line.

The in-vehicle network 23 is, for example, configured as a controller area network (CAN). The ECU 14 can control the steering system 13, the brake system 18, and the like by transmitting a control signal via the in-vehicle network 23. The ECU 14 can also receive a detection result obtained by the torque sensor 13b, a brake sensor 18b, the steering angle sensor 19, the range finding units 16 and 17, the accelerator sensor 20, the shift sensor 21, the wheel speed sensor 22, and the like, and an operation signal and the like of the operation input unit 10 via the in-vehicle network 23.

The ECU 14 includes, for example, a central processing unit (CPU) 14a, a read only memory (ROM) 14b, a random access memory (RAM) 14c, a display control unit 14d, a sound control unit 14e, a solid state drive (SSD, flash memory) 14f, and the like. The CPU 14a can perform various kinds of arithmetic processing and control such as image processing related to an image displayed on the display device 8, and control of the vehicle 1, for example. The CPU 14a can read out a computer program that is installed and stored in a non-volatile storage device such as the ROM 14b, and perform arithmetic processing in accordance with the computer program. The RAM 14c temporarily stores various kinds of data used for an arithmetic operation performed by the CPU 14a. The display control unit 14d mainly performs image processing using the captured image data obtained by the image-capturing unit 15, composition and the like of the captured image data displayed on the display device 8, and the like among pieces of arithmetic processing performed by the ECU 14. The sound control unit 14e mainly performs processing of sound data output by the sound output device 9 among the pieces of arithmetic processing performed by the ECU 14. The SSD 14f is a rewritable non-volatile storage unit, and can store data even in a case in which the ECU 14 is turned off. The CPU 14a, the ROM 14b, the RAM 14c, and the like may be accumulated in the same package. The ECU 14 may be configured by using another logical operation processor, logic circuit, and the like such as a digital signal processor (DSP) in place of the CPU 14a. A hard disk drive (HDD) may be disposed in place of the SSD 14f, or the SSD 14f and the HDD may be disposed separately from the ECU 14.

The brake system 18 includes, for example, an anti-lock brake system (ABS) that prevents locking caused by a brake, a sideslip prevention device (electronic stability control: ESC) that prevents the vehicle 1 from sideslipping at the time of cornering, an electric brake system that enhances braking force (executes brake assist), a brake by wire (BBW), and the like. The brake system 18 applies braking force to the wheel 3, and thus to the vehicle 1, via an actuator 18a. The brake system 18 can execute various kinds of control by detecting locking caused by the brake, idling of the wheel 3, a sign of sideslip, and the like based on a rotation difference between the left and the right wheels 3. The brake sensor 18b is, for example, a sensor that detects a position of a movable part of the braking operation unit 6. The brake sensor 18b can detect a position of the brake pedal as a movable part of the braking operation unit 6. The brake sensor 18b includes a displacement sensor.

The steering angle sensor 19 is, for example, a sensor that detects a steering amount of the steering unit 4 such as a steering wheel. For example, the steering angle sensor 19 is configured by using a hall element and the like. The ECU 14 acquires a steering amount of the steering unit 4 by the driver, a steering amount of each wheel 3 at the time of automatic steering, and the like from the steering angle sensor 19, and executes various kinds of control. The steering angle sensor 19 detects a rotation angle of a rotary portion included in the steering unit 4. The steering angle sensor 19 is an example of an angle sensor.

The accelerator sensor 20 is, for example, a sensor that detects a position of a movable part of the acceleration operating unit 5. The accelerator sensor 20 can detect a position of an accelerator pedal as a movable part. The accelerator sensor 20 includes a displacement sensor.

The shift sensor 21 is, for example, a sensor that detects a position of a movable part of the gear shift operating unit 7. The shift sensor 21 can detect positions of a lever, an arm, a button, and the like as movable parts of the gear shift operating unit 7. The shift sensor 21 may include a displacement sensor, or may be configured as a switch.

The wheel speed sensor 22 is a sensor that detects a rotation amount of the wheel 3 and a rotation speed per unit time thereof. The wheel speed sensor 22 outputs, as a sensor value, the number of wheel speed pulses indicating the detected rotation speed. For example, the wheel speed sensor 22 can be configured by using a hall element and the like. The ECU 14 operates a movement amount and the like of the vehicle 1 based on the sensor value acquired from the wheel speed sensor 22, and executes various kinds of control. The wheel speed sensor 22 is disposed in the brake system 18 in some cases. In such a case, the ECU 14 acquires a detection result of the wheel speed sensor 22 via the brake system 18.

The configuration, disposition, electrical connection form, and the like of various sensors and actuators described above are merely examples, and can be variously set (changed).

Figure 5:
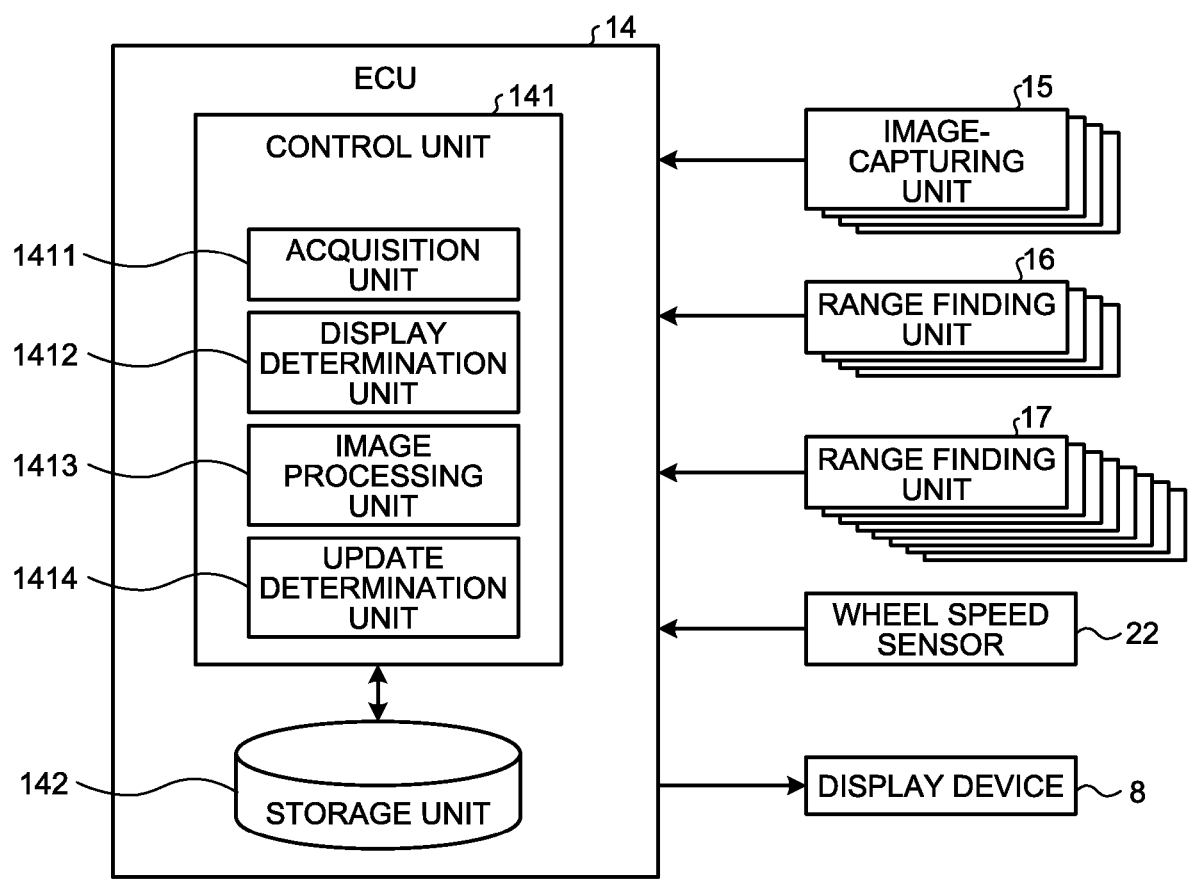
FIG. 5 is a block diagram illustrating a configuration and the like of an ECU of the periphery monitoring device according to the first embodiment.

In the present embodiment, the ECU 14 implements at least part of a function as the periphery monitoring device 100 with hardware and software (a control program) cooperating with each other. FIG. 5 is a block diagram illustrating a configuration and the like of the ECU 14 of the periphery monitoring device 100 according to the first embodiment. As illustrated in FIG. 5, the ECU 14 functions as a control unit 141 and a storage unit 142. The storage unit 142 stores a computer program to be executed by the control unit 141, data required for executing the computer program, and the like. The control unit 141 includes an acquisition unit 1411, a display determination unit 1412, an image processing unit 1413, and an update determination unit 1414.

The acquisition unit 1411 continuously acquires the captured image data from the image-capturing unit 15 that captures a region including a road surface in a traveling direction of the vehicle 1 and a region above the road surface, and stores the acquired captured image data in the storage unit 142 as needed. The acquisition unit 1411 also acquires various kinds of data from the range finding unit 16, the range finding unit 17, the wheel speed sensor 22, and the like.

The display determination unit 1412 determines whether to display the peripheral image on the display device 8. The display determination unit 1412 determines whether to display the peripheral image depending on whether a vehicle speed that is calculated based on a sensor value acquired from the wheel speed sensor 22 is lower than a threshold vehicle speed determined in advance, for example. An example of the threshold vehicle speed is 10 km/h. If the vehicle speed is lower than the threshold vehicle speed, for example, the display determination unit 1412 determines to display the peripheral image. The display determination unit 1412 may determine whether to display the peripheral image based on an operation instruction from the occupant that is received via the operation input unit 10.

In a case of displaying the peripheral image in the traveling direction of the vehicle 1 on the display device 8, the image processing unit 1413 displays a first region (captured target region) including a under-floor portion of a road surface of the vehicle 1 or a vicinity of the under-floor portion by using a corresponding image in past captured image data stored in the storage unit 142, and displays a second region (captured target region) including a region above the road surface by using a corresponding image in current captured image data acquired by the acquisition unit 1411.

More specifically, the image processing unit 1413 displays the first region by projecting a corresponding image in the past captured image data stored in the storage unit 142 on a first virtual projection surface that is set as a plane corresponding to the road surface in a three-dimensional virtual space. The image processing unit 1413 displays the second region by projecting a corresponding image in the current captured image data acquired by the acquisition unit 1411 on a second virtual projection surface that is set to rise from an end part of the first virtual projection surface or from the a vicinity of the end part in the three-dimensional virtual space. The image processing unit 1413 also displays a boundary between the first virtual projection surface and the second virtual projection surface to be distinguishable. Detailed description thereof will be made later.

The update determination unit 1414 determines whether to update the past image projected on the first virtual projection surface depending on whether the vehicle 1 has moved by a predetermined distance (for example, several meters), for example. The update determination unit 1414 also determines whether to update the current image projected on the second virtual projection surface depending on whether a predetermined time (for example, several tens of milliseconds) has elapsed, for example.

Figure 6:
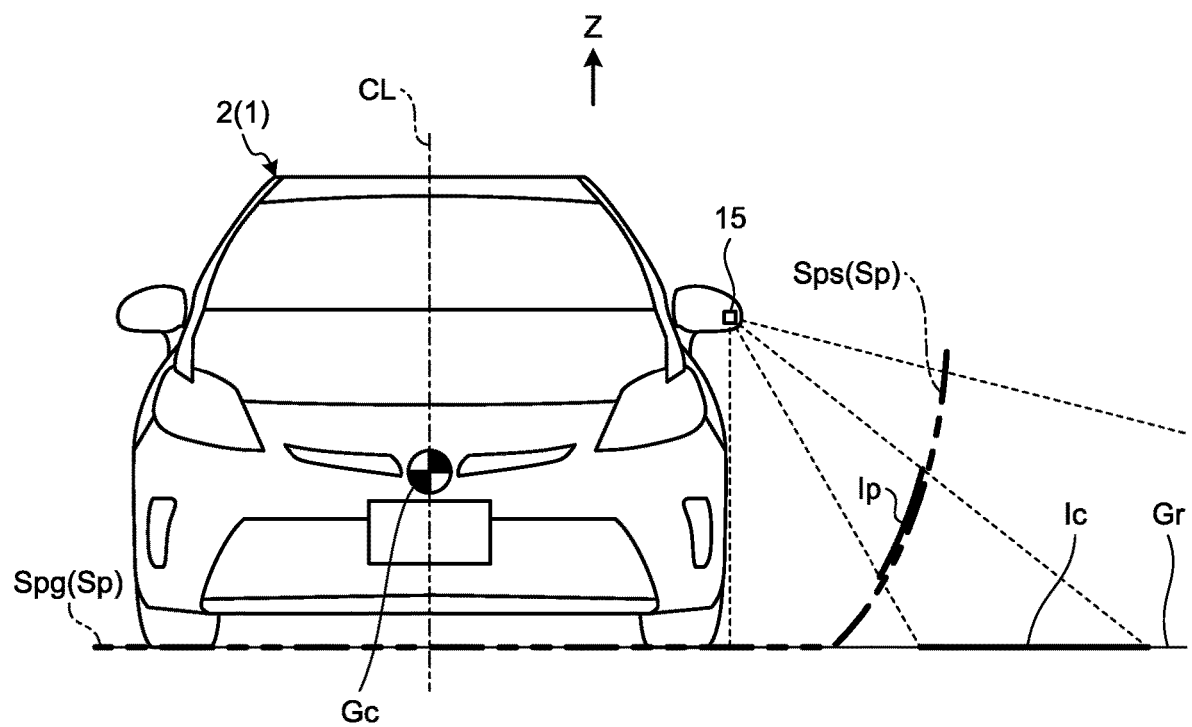
FIG. 6 is a schematic diagram for explaining projection of a captured image on a virtual projection surface performed by the periphery monitoring device according to the first embodiment.

FIG. 6 is a schematic diagram for explaining projection of the captured image on the virtual projection surface performed by the periphery monitoring device 100 according to the first embodiment. The image processing unit 1413 generates a viewpoint image based on the captured image data obtained by the image-capturing unit 15. The viewpoint image is an image obtained by viewing the virtual projection surface on which the captured image is projected from a virtual viewpoint, for example, an image subjected to virtual projection conversion or viewpoint conversion. The image processing unit 1413 performs image processing such as coordinate transformation or projection conversion on the captured image data obtained by the image-capturing unit 15 to obtain data of the viewpoint image.

In the example of FIG. 6, a virtual projection surface Sp includes a bottom surface Spg (first virtual projection surface) along the ground Gr (road surface), and a side surface Sps (second virtual projection surface) rising from the bottom surface Spg, that is, from the ground Gr. The ground Gr is a horizontal plane orthogonal to a vertical direction Z of the vehicle 1, and is a grounding surface for a tire. The bottom surface Spg is a flat surface having a substantially circular shape, and is a horizontal plane based on the vehicle 1. The side surface Sps is a curved surface being in contact with the bottom surface Spg. As illustrated in FIG. 6, on the side surface Sps, a shape of a vertical virtual cross section of the vehicle 1 passing through a center Gc of the vehicle 1 is, for example, an ellipse or a parabola. The side surface Sps is, for example, configured to be a rotary surface around a center line CL along the vertical direction Z of the vehicle 1 passing through the center Gc of the vehicle 1, and surrounds the periphery of the vehicle 1.

The image processing unit 1413 calculates a virtual projection image in a case of projecting the captured image on the virtual projection surface Sp. When a captured image Ic is projected on the ground Gr, the image becomes longer as being more distant from the image-capturing unit 15, and the length of the image seems longer than an actual length in an output image in some cases. As can be seen from FIG. 6, a length of a virtual projection image Ip projected on the side surface Sps rising from the ground Gr (bottom surface Spg) becomes shorter than that in a case in which the image is projected on the ground Gr, and the virtual projection image Ip is prevented from seeming to be longer than the actual length in the output image.

FIG. 6 explains a case of projecting the captured image on the virtual projection surface Sp on the side of the vehicle 1, but the same applies to a case of projecting the captured image on the virtual projection surface Sp in front of (or in the rear of) the vehicle 1.

Figure 7:
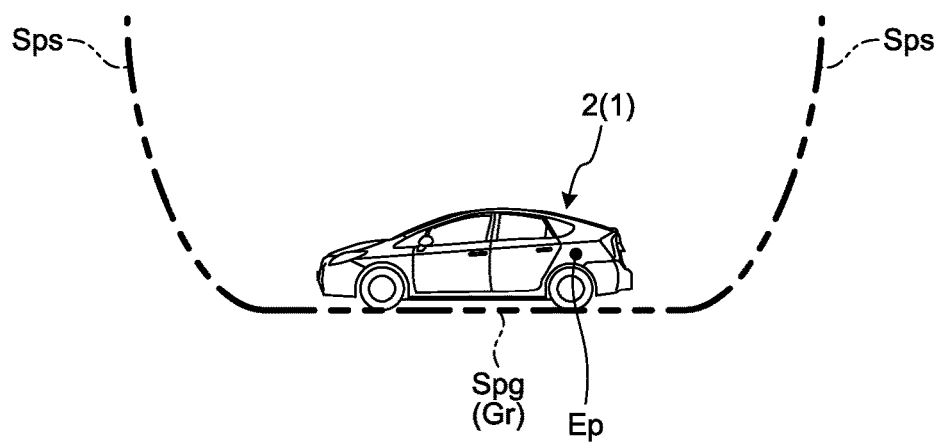
FIG. 7 is a schematic diagram for explaining projection of a captured image on the virtual projection surface performed by the periphery monitoring device according to the first embodiment.

FIG. 7 is a schematic diagram for explaining projection of the captured image on the virtual projection surface performed by the periphery monitoring device 100 according to the first embodiment. As illustrated in FIG. 7, the image processing unit 1413 converts the virtual projection image Ip (not illustrated in FIG. 7, refer to FIG. 6) projected on the virtual projection surface Sp into a viewpoint image obtained by viewing obliquely downward from a predetermined viewpoint Ep. The viewpoint Ep is, for example, set at a position facing a road surface on the under-floor portion of the vehicle 1 and a road surface on a vicinity of the under-floor portion.

Figure 8:
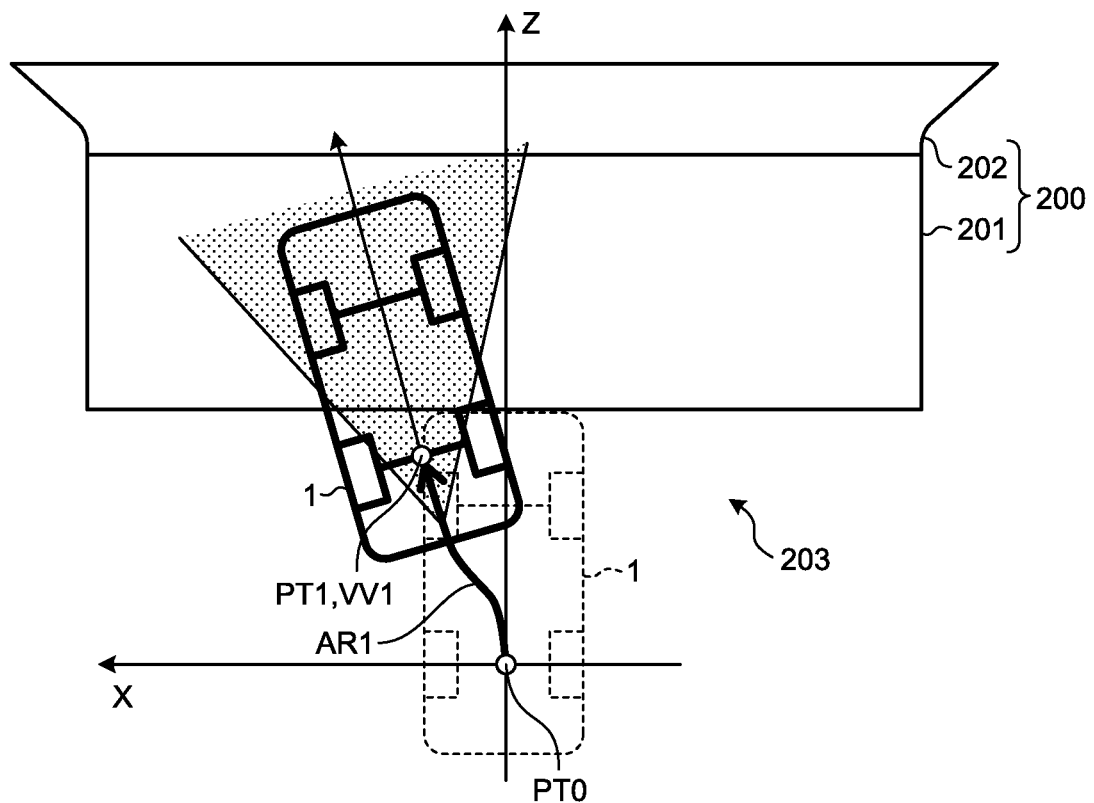
FIG. 8 is a schematic diagram for explaining generation of a peripheral image performed by an image processing unit according to the first embodiment.

FIG. 8 is a schematic diagram for explaining generation of the peripheral image performed by the image processing unit 1413 according to the first embodiment. FIG. 8 is a schematic plan view of the vehicle 1 and the periphery of the vehicle 1 in a state of moving to a virtual position PT1 along a thick arrow AR1 from an capturing position PT0 in a virtual space 203. In FIG. 8, the vehicle 1 at the capturing position PT0 is represented by a dotted line.

As illustrated in FIG. 8, the image processing unit 1413 sets, in the virtual space 203, the virtual position PT1 of the vehicle 1 corresponding to a current position of the vehicle 1 in the real space (for example, world coordinates). The image processing unit 1413 generates, as a peripheral image, an image obtained by viewing the captured image projected on a virtual projection surface 200 including a first virtual projection surface 201 (corresponding to the bottom surface Spg in FIG. 6 and FIG. 7) and a second virtual projection surface 202 (corresponding to the side surface Sps in FIG. 6 and FIG. 7) from a virtual viewpoint VV1 (corresponding to the viewpoint Ep in FIG. 7) that is set based on the virtual position PT1 of the vehicle 1. For example, the image processing unit 1413 assumes the virtual viewpoint VV1 as a starting point, and generates, as the peripheral image, an image viewed in a region (for example, a dot region in FIG. 8) having a setting angle determined in advance from regions on both sides of a virtual line of sight determined as a direction along the traveling direction (for example, a forward direction) from the starting point. The image processing unit 1413 may optionally set the position of the virtual viewpoint VV1 in accordance with the current position of the vehicle 1 or the virtual position PT1.

In FIG. 8, for convenience of illustration, the first virtual projection surface 201 and the second virtual projection surface 202 have a shape of extending in the horizontal direction of FIG. 8, but similarly to FIG. 6 and FIG. 7, the first virtual projection surface 201 and the second virtual projection surface 202 may be configured as rotary surfaces around the center line CL (FIG. 6) that pass through the center Gc (FIG. 6) of the vehicle 1 along the vertical direction of the vehicle 1 to surround the periphery of the vehicle 1.

The image processing unit 1413 may superimpose, for example, a vehicle image as an image of the vehicle 1 on the generated peripheral image. For example, this vehicle image is not an image captured by the image-capturing unit 15 but an image previously stored in the storage unit 142.

Figure 9:
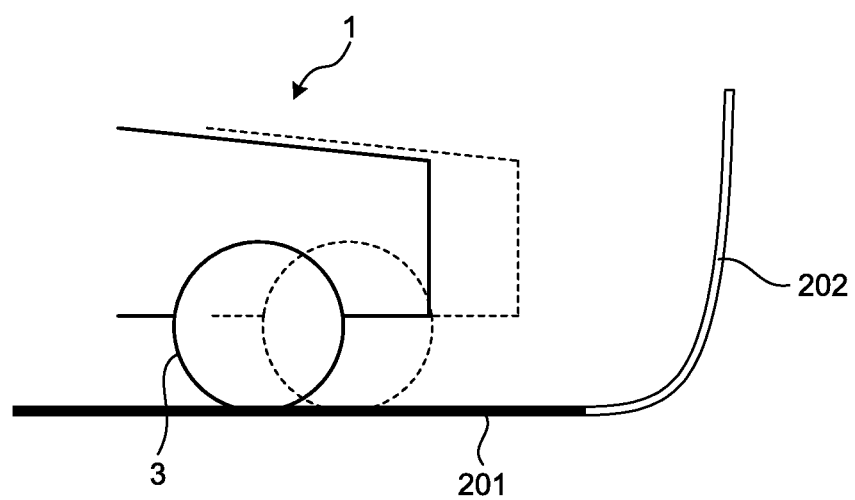
FIG. 9 is a schematic diagram illustrating a first virtual projection surface and a second virtual projection surface when viewed from a side surface of the vehicle according to the first embodiment.
Figure 10:
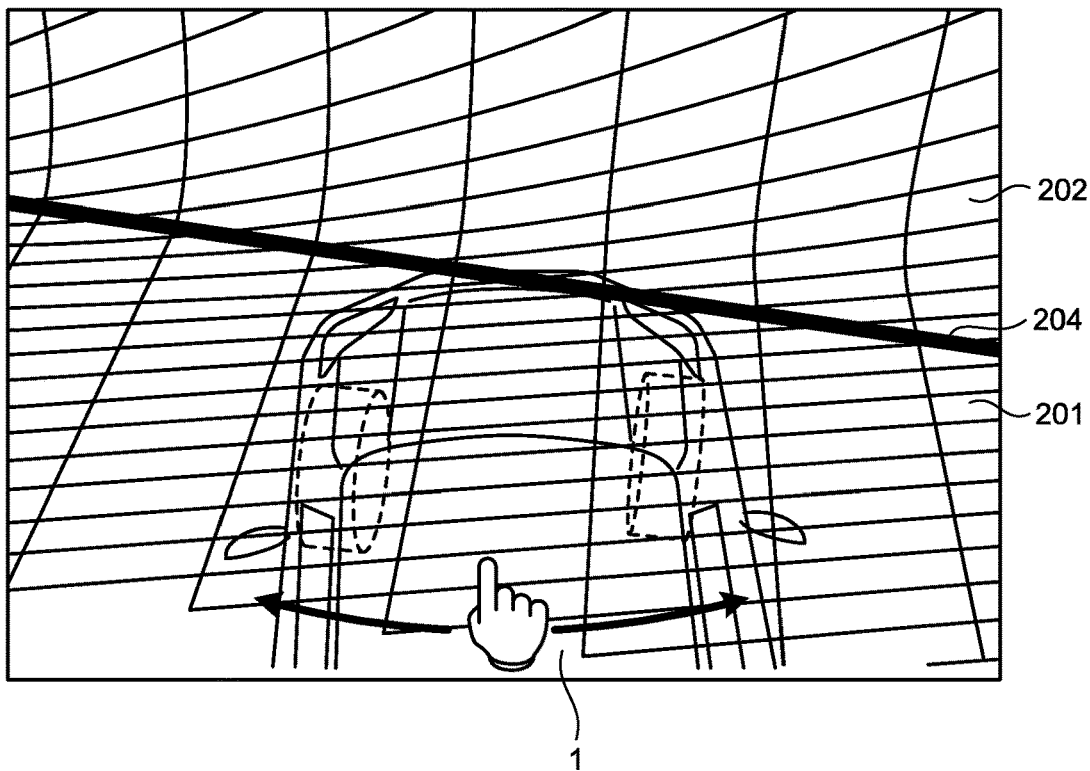
FIG. 10 is a schematic diagram illustrating a three-dimensional virtual space in front of the vehicle according to the first embodiment.
Figure 11:
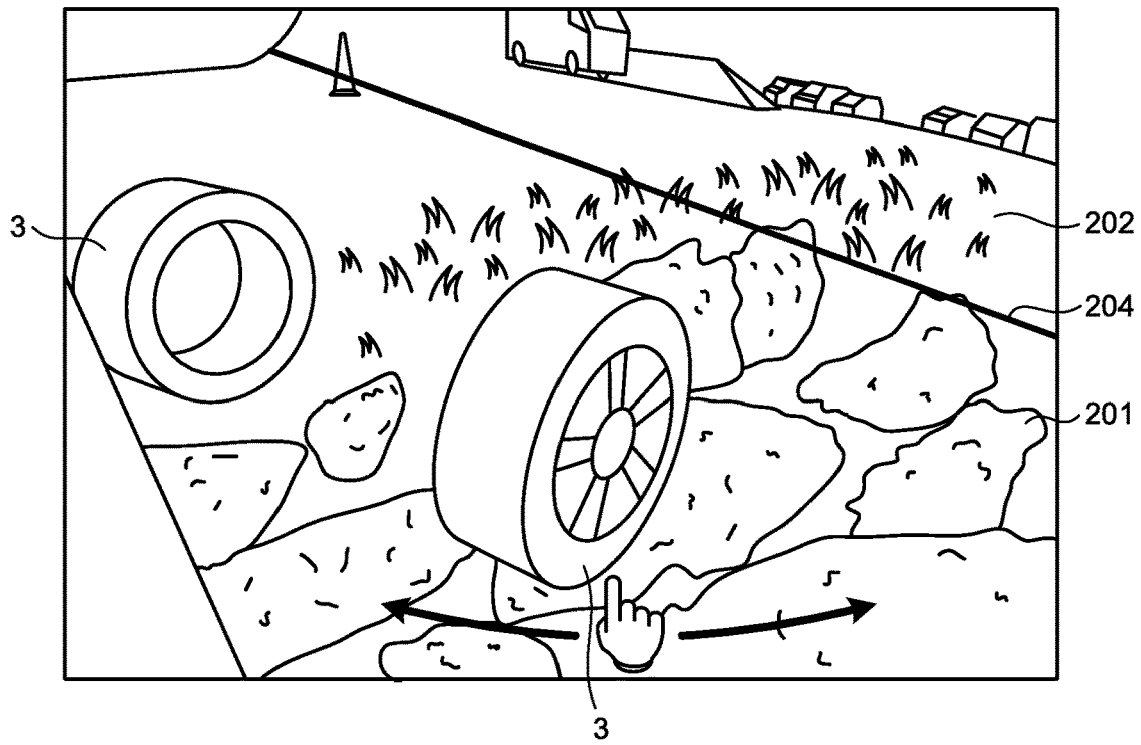
FIG. 11 is a schematic diagram illustrating a display example according to the first embodiment.

FIG. 9 is a schematic diagram illustrating the first virtual projection surface 201 and the second virtual projection surface 202 when viewed from the side surface of the vehicle 1 in the first embodiment. FIG. 10 is a schematic diagram illustrating the three-dimensional virtual space in front of the vehicle according to the first embodiment. FIG. 11 is a schematic diagram illustrating a display example according to the first embodiment.

As can be seen from the description with reference to FIG. 6 and FIG. 7, and from FIG. 9 to FIG. 11, the second virtual projection surface 202 is preferably raised from a position as close as possible to the vehicle 1 to enhance a sense of perspective of the entire peripheral image. The first virtual projection surface 201 is an area in which the moving object is rarely present. On the other hand, the second virtual projection surface 202 is an area in which the moving object is present with high possibility. By projecting the current image on the second virtual projection surface 202, the moving object can be displayed in the peripheral image in real time. By flattening the first virtual projection surface 201, a positional relation between the wheel 3 of the vehicle 1 and the road surface can be correctly displayed.

As illustrated in FIG. 10 and FIG. 11, as an example of displaying the boundary between the first virtual projection surface 201 and the second virtual projection surface 202 to be distinguishable in the peripheral image, the image processing unit 1413 displays a boundary line 204 between the first virtual projection surface 201 and the second virtual projection surface 202. Due to this, the occupant can clearly discriminate between a portion of the past image and a portion of the current image in display. As another example of displaying the boundary between the first virtual projection surface 201 and the second virtual projection surface 202 to be distinguishable, the image processing unit 1413 may separate the first virtual projection surface 201 from the second virtual projection surface 202 to be displayed, or may cause display modes such as luminance or a color of the first virtual projection surface 201 and the second virtual projection surface 202 to be different from each other to be displayed. Such processing of displaying the boundary between the first virtual projection surface 201 and the second virtual projection surface 202 to be distinguishable is performed only in a case of displaying the past image on the first virtual projection surface 201 and displaying the current image on the second virtual projection surface 202. That is, in a case of displaying both of the first virtual projection surface 201 and the second virtual projection surface 202 using one past image photographed at predetermined time, a continuous image without a joint can be obtained, and a more visible image can be displayed.

The image processing unit 1413 may display the second virtual projection surface 202 in color, and may display the first virtual projection surface 201 in monochrome or in sepia. Due to this, it is possible to emphasize that the first virtual projection surface 201 is the past image to the occupant. There is also an effect that, by causing the color of the first virtual projection surface 201 to be a single color, the occupant feels an image of the corresponding portion clear.

Figure 12:
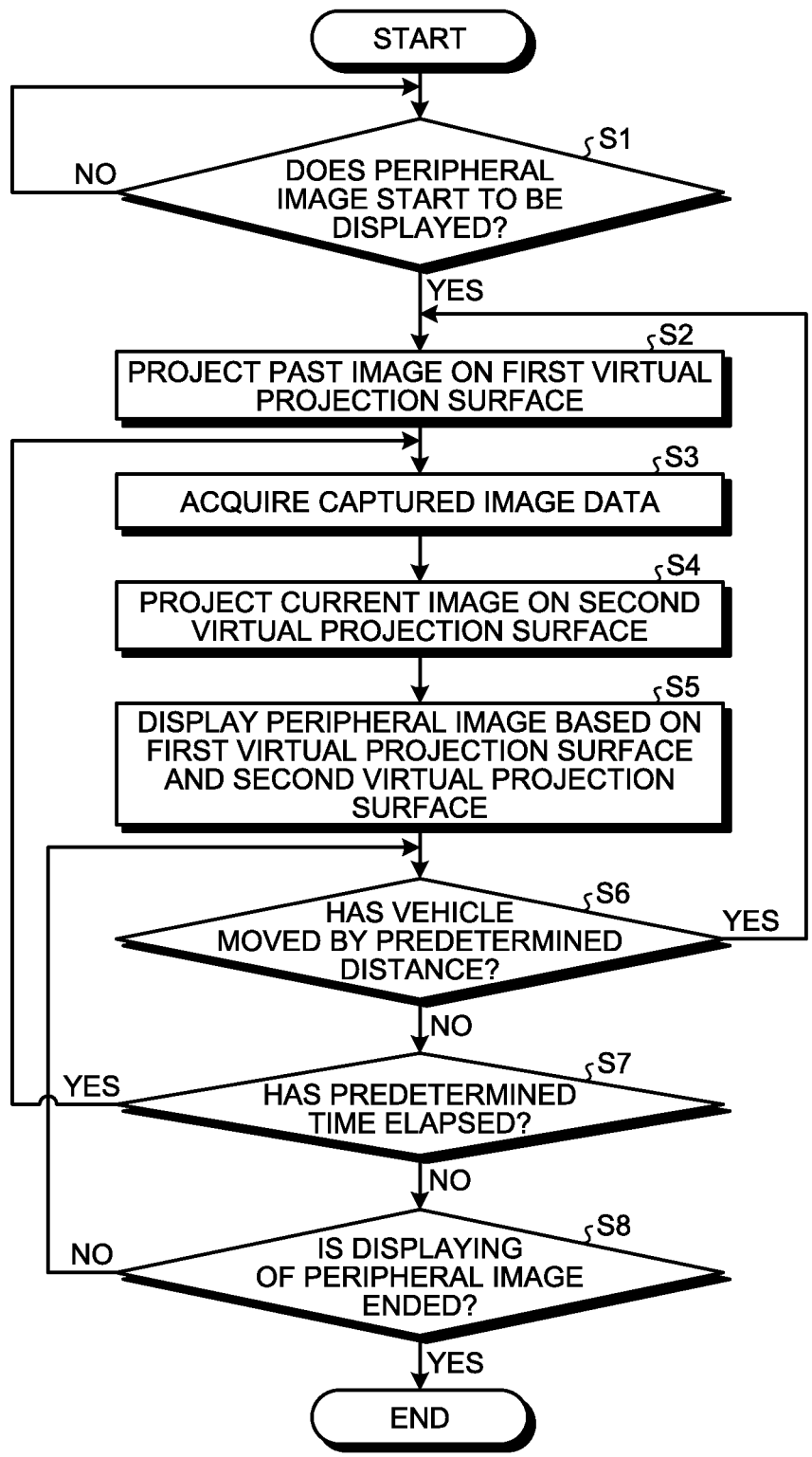
FIG. 12 is a flowchart illustrating processing of generating the peripheral image performed by the periphery monitoring device according to the first embodiment.

Next, with reference to FIG. 12, the following describes processing of generating the peripheral image performed by the periphery monitoring device 100 according to the first embodiment. FIG. 12 is a flowchart illustrating processing of generating the peripheral image performed by the periphery monitoring device 100 according to the first embodiment.

First, the display determination unit 1412 determines whether to start to display the peripheral image on the display device 8 (Step S1). If a determination result is Yes, the process proceeds to Step S2, and if the determination result is No, the process returns to Step S1. At Step S1, for example, in a case in which the vehicle speed that is calculated based on the sensor value acquired from the wheel speed sensor 22 is lower than the threshold vehicle speed determined in advance, the display determination unit 1412 determines to start to display the peripheral image.

At Step S2, the image processing unit 1413 projects, on the first virtual projection surface 201, a corresponding image (past image) in the past captured image data (for example, image data that is captured at a position several meters before) stored in the storage unit 142.

Next, at Step S3, the acquisition unit 1411 acquires the current captured image data from the image-capturing unit 15.

Next, at Step S4, the image processing unit 1413 projects, on the second virtual projection surface 202, a corresponding image (current image) in the current captured image data acquired at Step S3.

Next, at Step S5, the image processing unit 1413 displays, on the display device 8, the peripheral image based on the first virtual projection surface 201 and the second virtual projection surface 202 (refer to FIG. 11). At Step S5, the image processing unit 1413 also performs processing of displaying the boundary line 204 between the first virtual projection surface 201 and the second virtual projection surface 202 at the same time.

Next, at Step S6, the update determination unit 1414 determines whether the vehicle 1 has moved by a predetermined distance (for example, several meters) after Step S2. If a determination result is Yes, the process returns to Step S2, and the determination result is No, the process proceeds to Step S7. If the determination result is Yes at Step S6, the past image of the first virtual projection surface 201 is updated at Step S2.

At Step S7, the update determination unit 1414 determines whether a predetermined time (for example, several tens of milliseconds) has elapsed after Step S4. If a determination result is Yes, the process returns to Step S3, and the determination result is No, the process proceeds to Step S8. If the determination result is Yes at Step S7, the current image of the second virtual projection surface 202 is updated at Step S3 or steps subsequent thereto.

At Step S8, the display determination unit 1412 determines whether to end display of the peripheral image on the display device 8. If a determination result is Yes, the processing is ended, and if the determination result is No, the process returns to Step S6. At Step S8, for example, if the vehicle speed that is calculated based on the sensor value acquired from the wheel speed sensor 22 is equal to or higher than the threshold vehicle speed determined in advance, the display determination unit 1412 determines to end display of the peripheral image.

In this way, with the periphery monitoring device 100 according to the first embodiment, in a case of displaying the peripheral image including a under-floor portion of the vehicle 1 and a vicinity of the under-floor portion, the current moving object in the region of the peripheral image can also be displayed at the same time by displaying the first region including a road surface on the under-floor portion of the vehicle 1 or a road surface on the vicinity of the under-floor portion using the past image, and displaying the second region including the region above the road surface using the current image. Thus, the occupant can make various kinds of determination at the time of driving while considering the current moving object by referring to such a peripheral image that can display the current moving object at the same time.

The boundary between the first virtual projection surface 201 displayed by using the past image and the second virtual projection surface 202 displayed by using the current image is displayed to be distinguishable, so that the occupant can clearly discriminate between the portion of the past image and the portion of the current image in display, which is convenient for the occupant.

Second Embodiment

Figure 13:
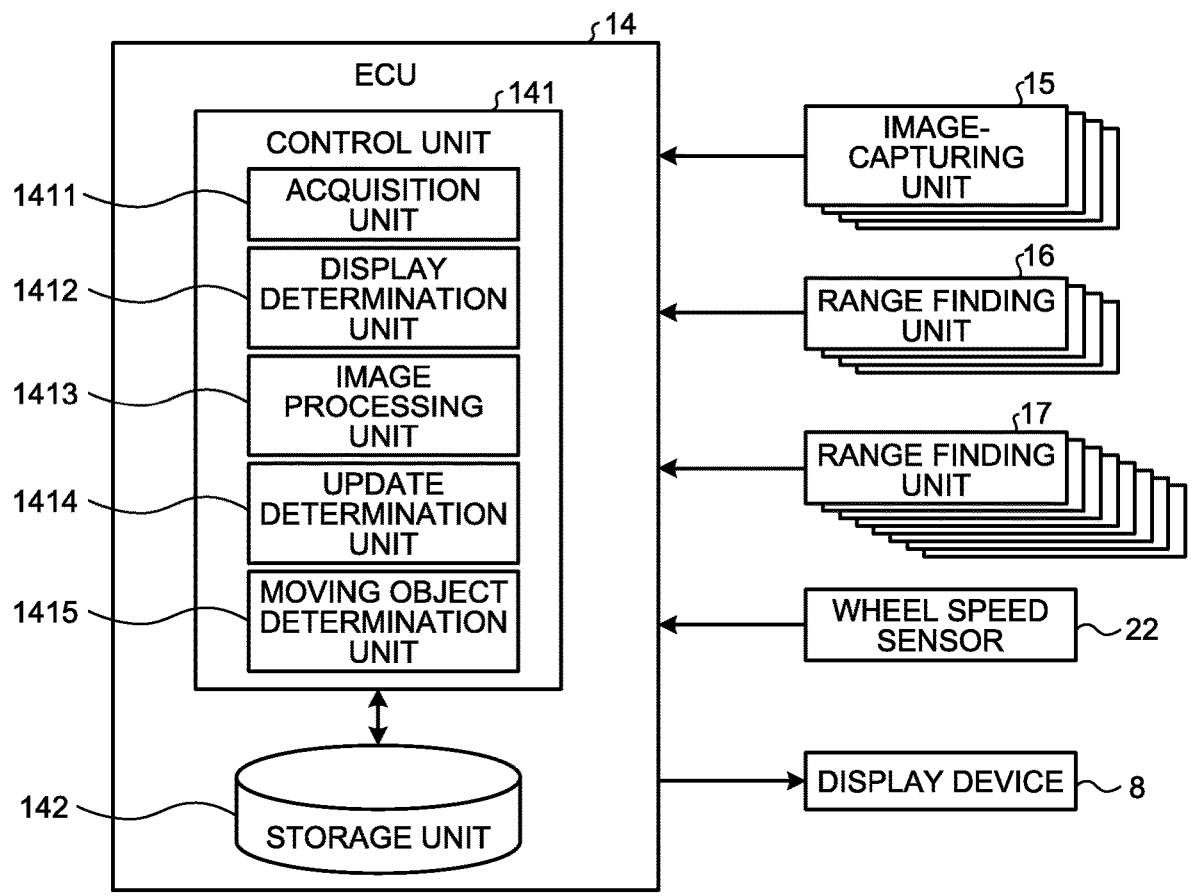
FIG. 13 is a block diagram illustrating a configuration and the like of an ECU of a periphery monitoring device according to a second embodiment.

Next, the following describes a second embodiment. Description about the same items as those in the first embodiment will be appropriately omitted. FIG. 13 is a block diagram illustrating a configuration and the like of the ECU 14 of the periphery monitoring device 100 according to the second embodiment. The ECU 14 in FIG. 13 is different from the ECU 14 in FIG. 5 in that a moving object determination unit 1415 is added to the control unit 141.

The moving object determination unit 1415 determines whether the moving object is present in the traveling direction of the vehicle 1 based on at least one of the captured image data from the image-capturing unit 15 acquired by the acquisition unit 1411, and the detection data from the range finding unit 16 or the range finding unit 17.

In a case of displaying the peripheral image in the traveling direction of the vehicle 1 on the display device 8, if the moving object determination unit 1415 does not determine that the moving object is present, the image processing unit 1413 displays both of the first region and the second region using a corresponding image in the past captured image data stored in the storage unit 142.

If the moving object determination unit 1415 determines that the moving object is present, the image processing unit 1413 performs switching to display the first region (first virtual projection surface 201) using a corresponding image in the past captured image data stored in the storage unit 142, and display the second region (second virtual projection surface 202) using a corresponding image in the current captured image data acquired by the acquisition unit 1411.

Figure 14:
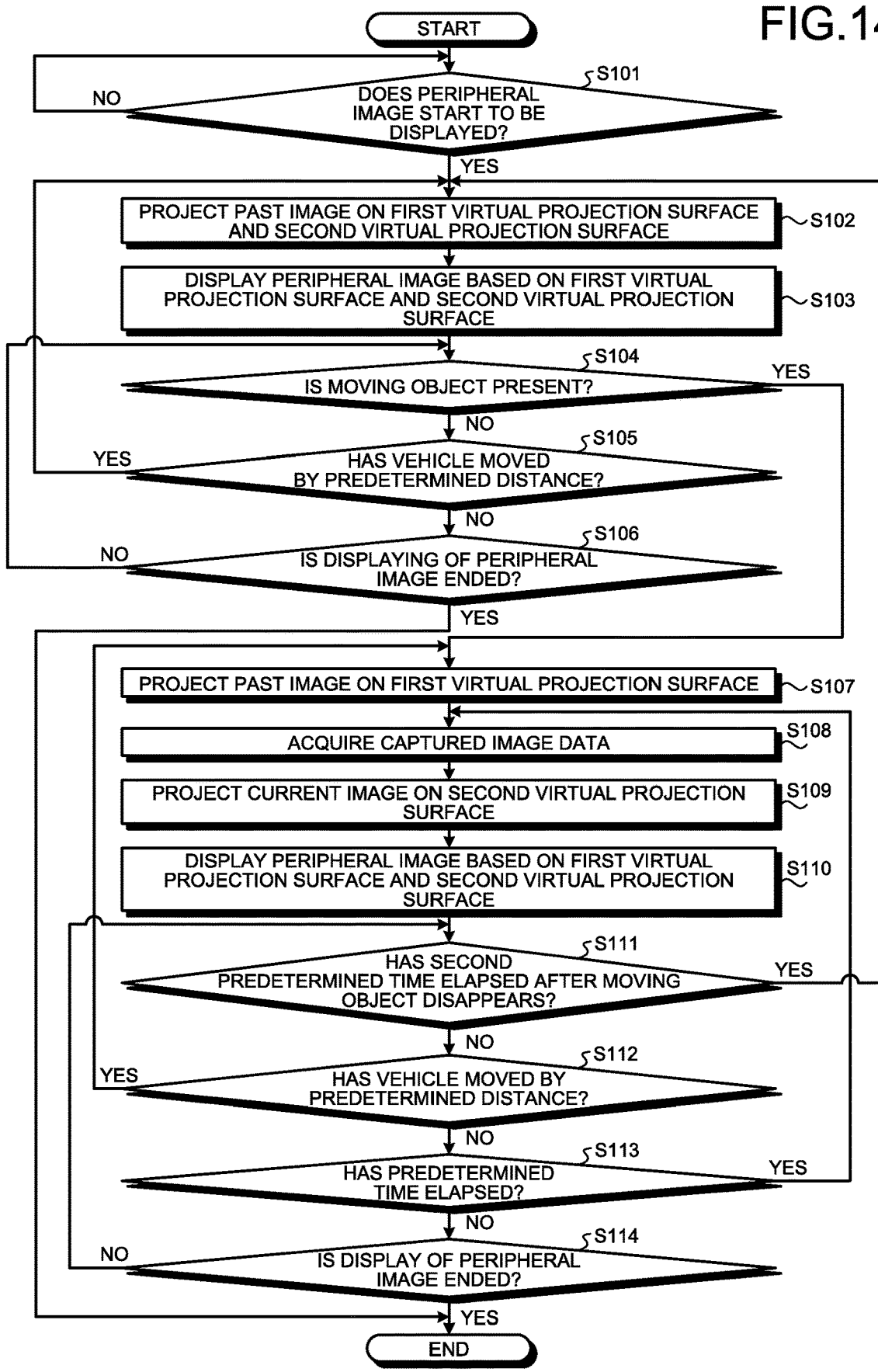
FIG. 14 is a flowchart illustrating processing of generating a peripheral image performed by the periphery monitoring device according to the second embodiment.

FIG. 14 is a flowchart illustrating processing of generating the peripheral image performed by the periphery monitoring device 100 according to the second embodiment. First, the display determination unit 1412 determines whether to start to display the peripheral image on the display device 8 (Step S101). If a determination result is Yes, the process proceeds to Step S102, and the determination result is No, the process returns to Step S101.

At Step S102, the image processing unit 1413 projects, on the first virtual projection surface 201 and the second virtual projection surface 202, a corresponding image (past image) in the past captured image data stored in the storage unit 142.

Next, at Step S103, the image processing unit 1413 displays, on the display device 8, the peripheral image based on the first virtual projection surface 201 and the second virtual projection surface 202. At Step S103, the image processing unit 1413 does not perform processing of displaying a boundary line between the first virtual projection surface 201 and the second virtual projection surface 202.

Next, at Step S104, the moving object determination unit 1415 determines whether the moving object is present in the traveling direction of the vehicle 1 based on at least one of the captured image data from the image-capturing unit 15 acquired by the acquisition unit 1411, and the detection data from the range finding unit 16 or the range finding unit 17. If a determination result is Yes, the process proceeds to Step S107, and the determination result is No, the process proceeds to Step S105.

At Step S105, the update determination unit 1414 determines whether the vehicle 1 has moved by a predetermined distance (for example, several meters) after Step S102. If a determination result is Yes, the process returns to Step S102, and the determination result is No, the process proceeds to Step S106. In a case in which the determination result is Yes at Step S105, the past image of the first virtual projection surface 201 and the second virtual projection surface 202 is updated at Step S102.

At Step S106, the display determination unit 1412 determines whether to end display of the peripheral image on the display device 8. If a determination result is Yes, the processing is ended, and if the determination result is No, the process returns to Step S104.

At Step S107, the image processing unit 1413 projects, on the first virtual projection surface 201, a corresponding image (past image) in the past captured image data stored in the storage unit 142.

Next, at Step S108, the acquisition unit 1411 acquires the current captured image data from the image-capturing unit 15.

Next, at Step S109, the image processing unit 1413 projects, on the second virtual projection surface 202, a corresponding image (current image) in the current captured image data acquired at Step S108.

Next, at Step S110, the image processing unit 1413 displays, on the display device 8, the peripheral image based on the first virtual projection surface 201 and the second virtual projection surface 202 (refer to FIG. 11). At Step S110, the image processing unit 1413 also performs processing of displaying the boundary line 204 (FIG. 11) between the first virtual projection surface 201 and the second virtual projection surface 202.

Next, at Step S111, the moving object determination unit 1415 determines whether a second predetermined time (for example, one minute) has elapsed after the moving object disappears. If a determination result is Yes, the process returns to Step S102, and if the determination result is No, the process proceeds to Step S112. If the determination result is Yes at Step S111, the state is returned to the state in which the past image is displayed on both of the first virtual projection surface 201 and the second virtual projection surface 202 at Step S102 or steps subsequent thereto.

At Step S112, the update determination unit 1414 determines whether the vehicle 1 has moved by a predetermined distance (for example, several meters) after Step S107. If a determination result is Yes, the process returns to Step S107, and the determination result is No, the process proceeds to Step S113. If the determination result is Yes at Step S112, the past image of the first virtual projection surface 201 is updated at Step S107.

At Step S113, the update determination unit 1414 determines whether a predetermined time (for example, several tens of milliseconds) has elapsed after Step S109. If a determination result is Yes, the process returns to Step S108, and if the determination result is No, the process proceeds to Step S114. If the determination result is Yes at Step S113, the current image of the second virtual projection surface 202 is updated at Step S108 or steps subsequent thereto.

At Step S114, the display determination unit 1412 determines whether to end display of the peripheral image on the display device 8. If a determination result is Yes, the processing is ended, and if the determination result is No, the process returns to Step S111.

In this way, with the periphery monitoring device 100 according to the second embodiment, in a case in which the moving object is not present, a continuous image without a joint can be obtained by displaying both of the first region (first virtual projection surface 201) and the second region (second virtual projection surface 202) using one past image photographed at predetermined time. If it is determined that the moving object is present, by switching display so that the second region (second virtual projection surface 202) is displayed by using the current image, the current moving object in the region of the peripheral image can also be displayed at the same time.

Third Embodiment

Figure 15:
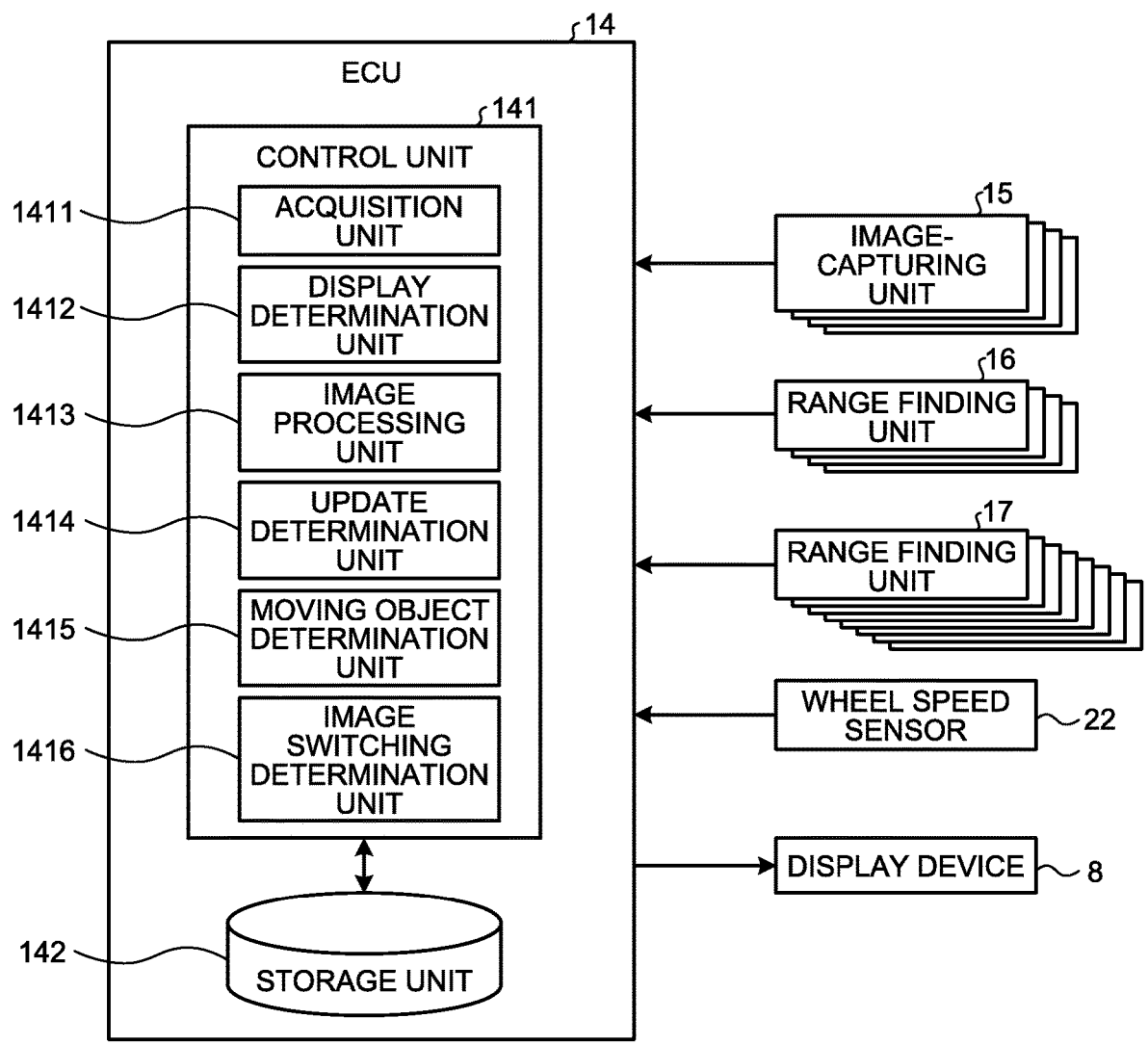
FIG. 15 is a block diagram illustrating a configuration and the like of an ECU of a periphery monitoring device according to a third embodiment.

Next, the following describes a third embodiment. Description about the same items as those in at least one of the first embodiment and the second embodiment will be appropriately omitted. FIG. 15 is a block diagram illustrating a configuration and the like of the ECU 14 of the periphery monitoring device 100 according to the third embodiment. The ECU 14 in FIG. 15 is different from the ECU 14 in FIG. 13 in that an image switching determination unit 1416 is added to the control unit 141.

In the third embodiment, if the moving object determination unit 1415 determines that the moving object is present, the image processing unit 1413 displays a screen for prompting the occupant to switch display so that the first region (first virtual projection surface 201) is displayed by using a corresponding image in the past captured image data stored in the storage unit 142, and the second region (second virtual projection surface 202) is displayed by using a corresponding image in the current captured image data acquired by the acquisition unit 1411. For example, the screen for prompting the occupant can be implemented by darkening the second region (second virtual projection surface 202) by lowering luminance thereof and the like, displaying the second region (second virtual projection surface 202) in red, causing the second region (second virtual projection surface 202) to blink, or the like.

The image switching determination unit 1416 determines whether the occupant has performed a screen switching operation on the screen for prompting the occupant. For example, the image switching determination unit 1416 performs the determination depending on whether the occupant performs an operation of touching, pushing, or moving the operation input unit 10 with a finger and the like at a position corresponding to the image displayed on the display screen of the display device 8.

Figure 16:
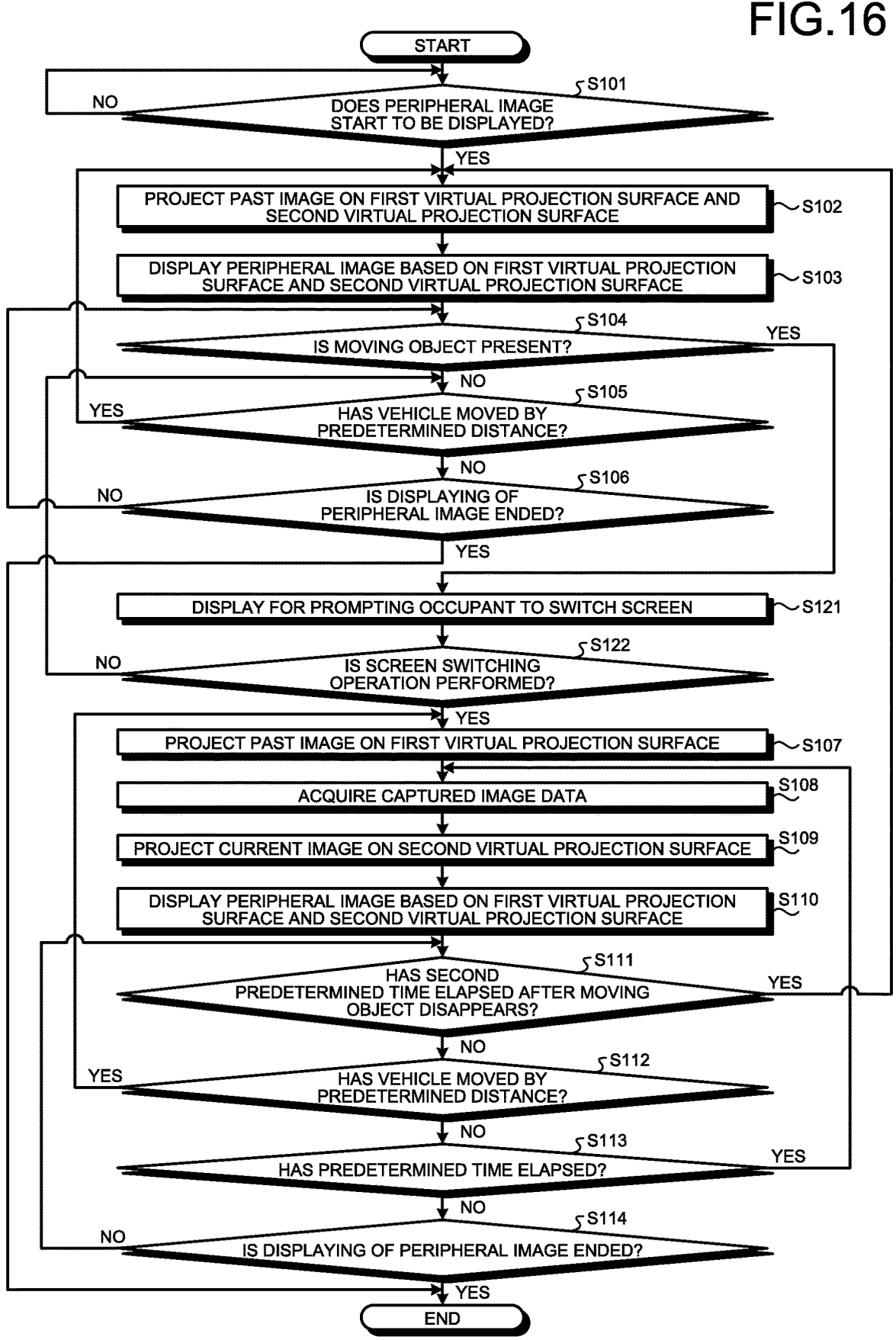
FIG. 16 is a flowchart illustrating processing of generating a peripheral image performed by the periphery monitoring device according to the third embodiment.

FIG. 16 is a flowchart illustrating processing of generating the peripheral image performed by the periphery monitoring device 100 according to the third embodiment. The flowchart in FIG. 16 is different from the flowchart in FIG. 14 only in that Step S121 and Step S122 are added thereto, so that description about the same points will not be repeated.

If the determination result is Yes at Step S104, at Step S121, the image processing unit 1413 displays a screen for prompting the occupant to switch display so that the second region (second virtual projection surface 202) is displayed by using a corresponding image in the current captured image data acquired by the acquisition unit 1411.

Next, at Step S122, the image switching determination unit 1416 determines whether the occupant has performed the screen switching operation on the screen. If a determination result is Yes, the process proceeds to Step S107, and if the determination result is No, the process proceeds to Step S105.

In this way, with the periphery monitoring device 100 according to the third embodiment, when the moving object is not present, a continuous image without a joint can be obtained by displaying both of the first region (first virtual projection surface 201) and the second region (second virtual projection surface 202) by using one past image photographed at predetermined time. If it is determined that the moving object is present, by displaying a screen for prompting the occupant to switch display so that the second region (second virtual projection surface 202) is displayed by using the current image, the occupant is enabled to freely select whether to switch the screen.

Fourth Embodiment

Next, the following describes a fourth embodiment. Description about the same items as those in at least one of the first embodiment to the third embodiment will be appropriately omitted. The ECU 14 is configured as illustrated in FIG. 13.

In the fourth embodiment, in a case of displaying the peripheral image in the traveling direction of the vehicle 1 on the display device 8, if the moving object determination unit 1415 determines that the moving object is present, the image processing unit 1413 moves a boundary portion (the boundary line 204, a separating portion, and the like) between the first virtual projection surface 201 and the second virtual projection surface 202 based on the position of the moving object in the peripheral image.

Figure 17:
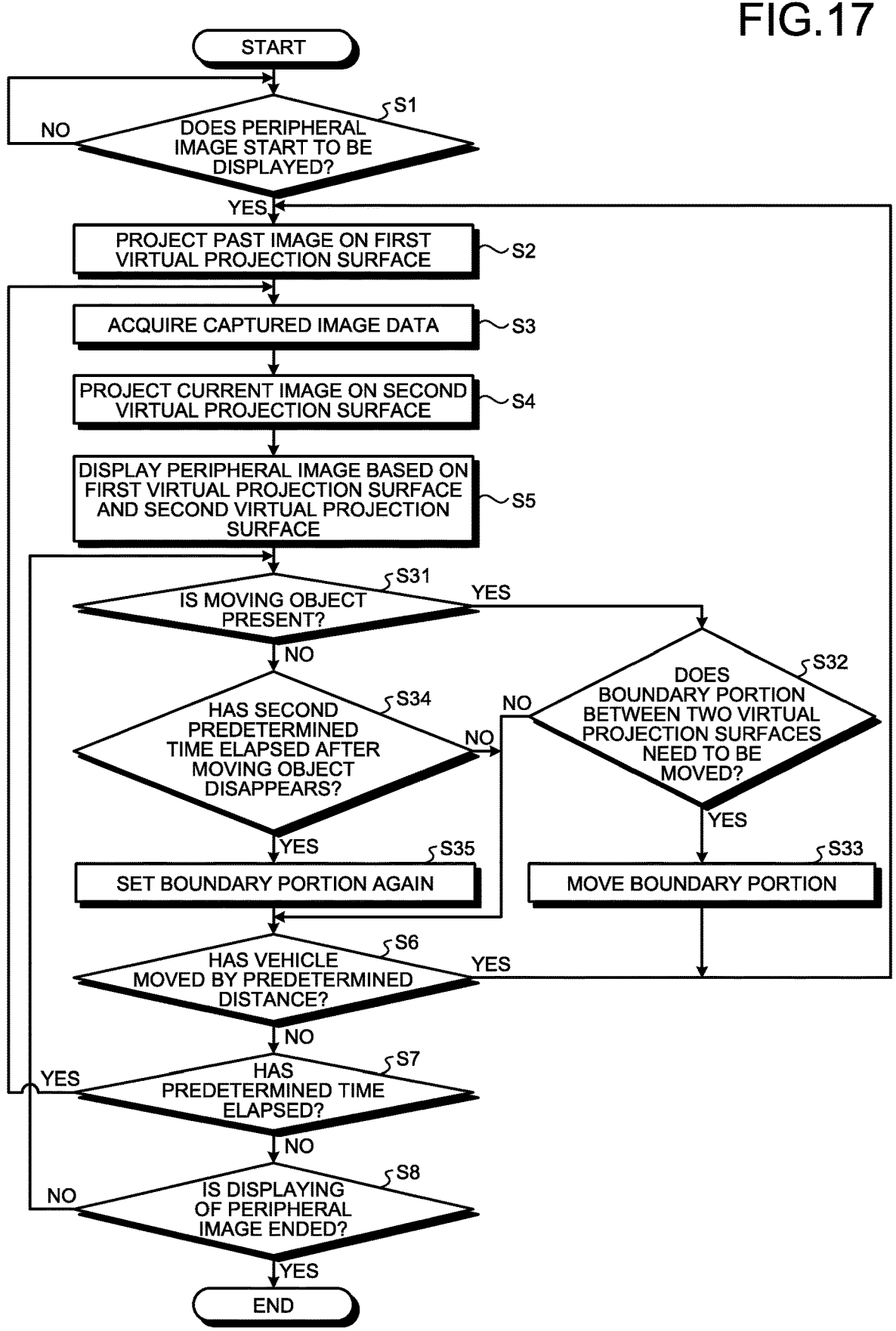
FIG. 17 is a flowchart illustrating processing of generating a peripheral image performed by a periphery monitoring device according to a fourth embodiment.

FIG. 17 is a flowchart illustrating processing of generating the peripheral image performed by the periphery monitoring device 100 according to the fourth embodiment. Description about the same processing (steps) as that in the flowchart of FIG. 12 will be appropriately omitted.

After Step S5, at Step S31, the moving object determination unit 1415 determines whether the moving object is present in the traveling direction of the vehicle 1 based on at least one of the captured image data from the image-capturing unit 15 acquired by the acquisition unit 1411, the detection data from the range finding unit 16 and the range finding unit 17. If a determination result is Yes, the process proceeds to Step S32, and if the determination result is No, the process proceeds to Step S34.

At Step S32, the image processing unit 1413 determines whether the boundary portion between the two virtual projection surfaces (the first virtual projection surface 201 and the second virtual projection surface 202) needs to be moved. If a determination result is Yes, the process proceeds to Step S33, and if the determination result is No, the process proceeds to Step S6. At Step S32, the image processing unit 1413 determines that the boundary portion needs to be moved if a predetermined proportion or more of an area of the moving object in the peripheral image falls within the first virtual projection surface 201, but the embodiment is not limited thereto.

Figure 18:
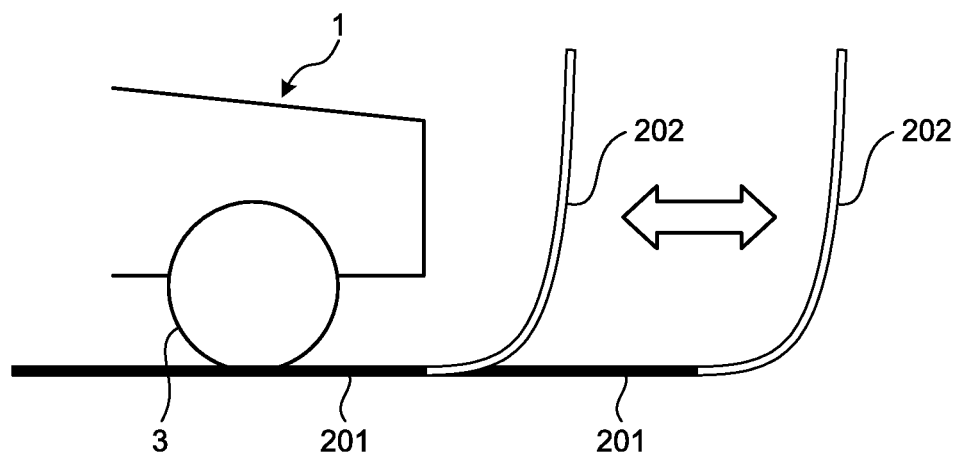
FIG. 18 is a schematic diagram for explaining movement of a boundary portion between a first virtual projection surface and a second virtual projection surface according to the fourth embodiment.

At Step S33, the image processing unit 1413 moves the boundary portion between the two virtual projection surfaces. At Step S33, for example, the image processing unit 1413 moves the boundary portion so that the proportion of the area of the moving object in the peripheral image falling within the first virtual projection surface 201 becomes smaller than a predetermined value. FIG. 18 is a schematic diagram for explaining movement of the boundary portion between the first virtual projection surface 201 and the second virtual projection surface 202 according to the fourth embodiment. As illustrated in FIG. 18, the image processing unit 1413 moves the boundary portion to be closer to the vehicle 1, or to be more distant from the vehicle 1.

Returning to FIG. 17, at Step S34, the moving object determination unit 1415 determines whether the second predetermined time (for example, one minute) has elapsed after the moving object disappears. If a determination result is Yes, the process proceeds to Step S35, and the determination result is No, the process proceeds to Step S6.

At Step S35, the image processing unit 1413 sets the boundary portion again (for example, returns the boundary portion to an initial setting). After Step S35, the process proceeds to Step S6.

In this way, with the periphery monitoring device 100 according to the fourth embodiment, if it is determined that the moving object is present, by moving the boundary portion between the first virtual projection surface 201 and the second virtual projection surface 202 based on the position of the moving object in the peripheral image, the occupant is enabled to recognize the presence of the moving object more easily. The image processing unit 1413 may change the virtual viewpoint in a case of generating the peripheral image to a position at which the moving object can be easily seen.

the embodiments and the modifications are merely examples, and do not intend to limit the scope of the invention. These novel embodiments can be implemented in various other forms, and can be variously omitted, replaced, and modified without departing from the gist of the invention as disclosed. The embodiments and the modifications thereof are encompassed by the scope and the gist of the invention as disclosed, and also encompassed as claimed and an equivalent thereof.

The invention claimed is:

1. A periphery monitoring device comprising:
at least one processor configured to implement:
   an acquisition unit configured to acquire captured image data from an image-capturing unit that captures a region including a road surface in a traveling direction of a vehicle and a region above the road surface;
   an image processing unit configured to display, in a case of displaying a peripheral image in the traveling direction of the vehicle on a display unit, a first region including a road surface on a under-floor portion of the vehicle or a road surface on a vicinity of the under-floor portion by using a corresponding image in past captured image data stored in the memory, and display a second region including the region above the road surface by using a corresponding image in current captured image data acquired by the acquisition unit; and
   a moving object determination unit configured to determine whether a moving object is present in the traveling direction of the vehicle based on at least one of the captured image data from the image-capturing unit acquired by the acquisition unit and detection data from a range sensor disposed in the vehicle; and
   a memory configured to store therein the captured image data, wherein, in a case of displaying the peripheral image in the traveling direction of the vehicle on the display unit, the image processing unit switches display so that, when the moving object determination unit does not determine that the moving object is present, a corresponding image in the past captured image data stored in the memory is used for displaying both of the first region and the second region, and, when the moving object determination unit determines that the moving object is present, the first region is displayed by using a corresponding image in the past captured image data stored in the memory, and the second region is displayed by using a corresponding image in the current captured image data acquired by the acquisition unit.

2. A periphery monitoring device comprising:
at least one processor configured to implement:
   an acquisition unit configured to acquire captured image data from an image-capturing unit that captures a region including a road surface in a traveling direction of a vehicle and a region above the road surface;
   an image processor configured to display images;
   an image processing unit configured to display, in a case of displaying a peripheral image in the traveling direction of the vehicle on a display unit, a first region including a road surface on a under-floor portion of the vehicle or a road surface on a vicinity of the under-floor portion by using a corresponding image in past captured image data stored in the memory, and display a second region including the region above the road surface by using a corresponding image in current captured image data acquired by the acquisition unit; and
   a moving object determination unit configured to determine whether a moving object is present in the traveling direction of the vehicle based on at least one of the captured image data from the image-capturing unit acquired by the acquisition unit and detection data from a range sensor disposed in the vehicle; and
a memory configured to store therein the captured image data, wherein in a case of displaying the peripheral image in the traveling direction of the vehicle on the display unit, the image processing unit displays a screen for prompting an occupant to switch display so that, when the moving object determination unit does not determine that the moving object is present, a corresponding image in the past captured image data stored in the memory is used for displaying both of the first region and the second region and, when the moving object determination unit determines that the moving object is present, the first region is displayed by using a corresponding image in the past captured image data stored in the memory, and the second region is displayed by using a corresponding image in the current captured image data acquired by the acquisition unit.

* * * * *